US 6,675,573 B2

(12) United States Patent
Kempfer

(10) Patent No.: US 6,675,573 B2
(45) Date of Patent: Jan. 13, 2004

(54) VEHICLES CONTAINING AND METHODS FOR USING A PRE-HEATER TO REDUCE EMISSIONS, AND FOR WARMING FUEL CELLS AT LOW AMBIENT TEMPERATURES

(75) Inventor: Stephen Thomas Kempfer, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 254 days.

(21) Appl. No.: 09/761,613

(22) Filed: Jan. 17, 2001

(65) Prior Publication Data

US 2002/0092294 A1 Jul. 18, 2002

(51) Int. Cl.⁷ .................................................. F01N 3/00
(52) U.S. Cl. ............................ 60/284; 60/274; 60/300; 429/13; 429/19
(58) Field of Search .......................... 60/274, 284, 300; 48/76; 320/15; 180/65.3, 309; 429/13, 19, 20, 22, 24, 26

(56) References Cited

U.S. PATENT DOCUMENTS

| | | | | |
|---|---|---|---|---|
| 4,820,594 A | * | 4/1989 | Sugita et al. ................... | 429/13 |
| 5,141,823 A | * | 8/1992 | Wright et al. ................... | 429/19 |
| 5,290,641 A | * | 3/1994 | Harashima ..................... | 429/24 |
| 5,388,404 A | * | 2/1995 | Tsumura ........................ | 60/284 |
| 5,390,488 A | * | 2/1995 | Ament et al. ................... | 60/284 |
| 5,390,493 A | * | 2/1995 | Fujishita et al. ............... | 60/284 |
| 5,488,283 A | * | 1/1996 | Dougherty et al. ............ | 320/15 |
| 5,503,804 A | * | 4/1996 | Fujishita et al. ............... | 60/300 |
| 5,527,632 A | * | 6/1996 | Gardner ........................ | 429/19 |
| 5,753,383 A | | 5/1998 | Cargnelli et al. | |
| 5,789,092 A | | 8/1998 | Spiers et al. | |
| 5,813,222 A | | 9/1998 | Appleby | |
| 5,837,393 A | * | 11/1998 | Okamoto ....................... | 429/20 |
| 5,953,908 A | | 9/1999 | Appleby | |
| 5,964,089 A | | 10/1999 | Murphy et al. | |
| 5,968,456 A | | 10/1999 | Parise | |
| 5,997,594 A | * | 12/1999 | Edlund et al. ................. | 48/76 |
| 6,036,827 A | | 3/2000 | Andrews et al. | |
| 6,232,005 B1 | * | 5/2001 | Pettit ............................ | 429/19 |

OTHER PUBLICATIONS

English Abstract of JP7094202A2 (Inventors: Hajime et al.; Issued: Apr. 7, 1995).
English Abstract of JP57196480A2 (Inventor: Masashi; Issued: Dec. 2, 1982).

* cited by examiner

*Primary Examiner*—Thomas Denion
*Assistant Examiner*—Tu M. Nguyen
(74) *Attorney, Agent, or Firm*—Brinks Hofer Gilson & Lione; Gregory H. Zayia

(57) ABSTRACT

A vehicle includes a fuel cell that generates electricity, a pre-heater electrically coupled to the fuel cell, wherein the pre-heater provides an output, and a component configured to receive a portion of the output, wherein a temperature of the component is changed through receipt of the portion of the output. In addition, a method is described for operating a fuel cell in a vehicle that includes: generating electricity from the fuel cell, and providing a portion of the electricity to a pre-heater, which provides an output to a vehicular component, thereby pre-heating the component.

29 Claims, 4 Drawing Sheets

VEHICLES CONTAINING AND METHODS FOR USING A PRE-HEATER TO REDUCE EMISSIONS, AND FOR WARMING FUEL CELLS AT LOW AMBIENT TEMPERATURES

BACKGROUND

The present invention is directed to fuel cells. More particularly, the present invention is directed to vehicles containing fuel cells, to methods for warming the fuel cells at low ambient temperatures, and to methods for reducing emissions of vehicles containing fuel cells.

A fuel cell is an electrochemical device that generates electricity from the electrochemical reaction between a fuel, such as hydrogen, and an oxidant, such as oxygen. Water is generally produced as a byproduct of this electrochemical reaction. Thus, it is important that water-producing fuel cells be maintained at temperatures above the freezing point of water in order to be operable and to prevent damage to the cells. Freezing can lead to mechanical strain on the cells and, thus, to reduced lifetimes.

To prevent freezing of a fuel cell when the ambient temperature approaches the freezing point of water, a strategy has been devised for applying a resistive load in parallel with the fuel cell (e.g., U.S. Pat. No. 5,789,092). However, such a method for warming the fuel cell entails considerable waste of power in the form of thermal energy, which is undesirable. An alternative strategy wherein the fuel cell is activated at low ambient temperature, and the electricity produced by the fuel cell stored in a battery is unsatisfactory because a limit in the storage capacity of the battery will eventually be reached. Thus, there remains the need to develop a method of warming a fuel cell in low ambient temperatures that avoids both the waste of power and the inadequacy of battery storage capacity.

It is appreciated in the art that a significant fraction (e.g., at least about 70%) of the unacceptable emissions produced by a vehicle equipped with a catalytic converter is generated in the period immediately following a cold start-up operation. Vehicles employing a fuel cell in the place of an alternator, as well as full-vehicle fuel cells incorporating a gasoline or methanol reformer, are both generally equipped with catalytic converters. Thus, both types of fuel cell-containing vehicles are subject to a period of high emissions following cold start-up. Once the catalyst attains its peak operating temperature, however, the corresponding vehicular emissions decrease significantly.

A strategy has been devised to reduce vehicular emissions by preheating the catalytic converter using electricity from the battery (e.g., U.S. Pat. No. 5,964,089). However, since the electrical load placed on the car battery during the pre-heating period may exceed the rated battery output and, at any rate, contributes to the shortened lifetime of the battery, a more practical solution is required. Similarly, pre-heating the catalytic converter using electricity from the alternator is an unsatisfactory solution because of the strain that is placed on the battery and because of the need for employing an oversized alternator (e.g., U.S. Pat. No. 5,964,089). Thus, there remains the need to develop a method for reducing vehicular emissions during the period following a cold start up which avoids the aforementioned problems.

In short, in vehicles containing a fuel cell, there are continued and pressing needs to develop methods for warming the fuel cell at low ambient temperatures, and for reducing vehicular emissions.

SUMMARY

The scope of the present invention is defined solely by the appended claims, and is not affected to any degree by the statements within this summary. By way of introduction, the presently preferred embodiments described herein are directed towards remedying the aforementioned problems in warming fuel cells at low ambient temperatures, and in reducing vehicular emissions.

Briefly stated, a vehicle embodying features of the present invention includes a fuel cell that generates electricity, a pre-heater which provides an output and which is electrically coupled to the fuel cell, and a component configured to receive a portion of the output provided by the pre-heater, such that a temperature of the component is changed through receipt of the portion of the output.

A method for operating a fuel cell in a vehicle embodying features of the present invention includes generating electricity from the fuel cell, and providing a portion of the electricity to a pre-heater, which provides an output to a vehicular component, thereby pre-heating the component.

A second method for operating a fuel cell in a vehicle in accord with the present invention includes measuring a temperature, activating the fuel cell when the measured temperature is below a minimum set point, generating electricity from the fuel cells and providing a portion of the electricity to a pre-heater, which provides an output to a vehicular component to pre-heat the component.

A third method for operating a fuel cell in a vehicle in accord with the present invention includes measuring a temperature, generating electricity from the fuel cell, providing a portion of the electricity to a pre-heater, which provides an output to a vehicular component to pre-heat the component, decreasing the portion of electricity provided to the pre-heater when the measured temperature is below a minimum set point, and increasing the portion of electricity provided to the pre-heater when the measured temperature is above a maximum set point.

DETAILED DESCRIPTION OF THE PRESENTLY PREFERRED EMBODIMENTS

Throughout this description and in the appended claims, the phrase "fuel cell" should be understood as referring to any type of fuel cell, including but not limited to: polymer electrolyte membrane (PEM) fuel cells, direct methanol fuel cells, alkaline fuel cells, phosphoric acid fuel cells, molten carbonate fuel cells, solid oxide fuel cells, and any combination thereof. In addition, the phrase "fuel cell" should be understood as encompassing one or multiple individual fuel cells, and one or multiple individual "stacks" (i.e., electrically coupled combinations) of fuel cells. Furthermore, the phrases "fuel cell load," "load point of a fuel cell," and the like should be understood as referring to the quantity of power delivered by a fuel cell to a device electrically coupled to the fuel cell. Moreover, the phrase "measured temperature" should be understood as encompassing the temperature either distal or proximal to a vehicular fuel cell, with the former being represented by the meteorological temperature external to the vehicle, and the latter by the operating temperature of the fuel cell.

Figure 1:
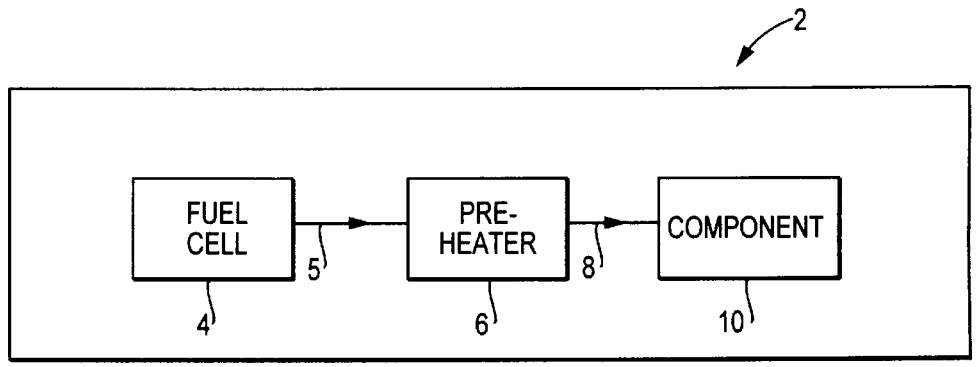
FIG. 1 is a partial view of a vehicle in which a fuel cell connected to the pre-heater of a vehicular component is shown schematically.

It has been discovered that the fuel cell can be activated at a predetermined minimum temperature, and that the electricity generated thereby can be used to power the pre-heater of a vehicular component. FIG. 1 shows a first embodiment of a vehicle 2 embodying features of the present invention. A fuel cell 4 that generates electricity 5 is electrically coupled to a pre-heater 6 that provides an output 8 to a component 10 configured to receive a portion of the output 8, such that a temperature of the component 10 is changed through receipt of the portion of the output 8. Preferably, the component is one that would benefit from pre-heating. More preferably, this component is selected from the group consisting of a catalytic converter, a gasoline reformer, a methanol reformer, and combinations thereof.

Figure 2:
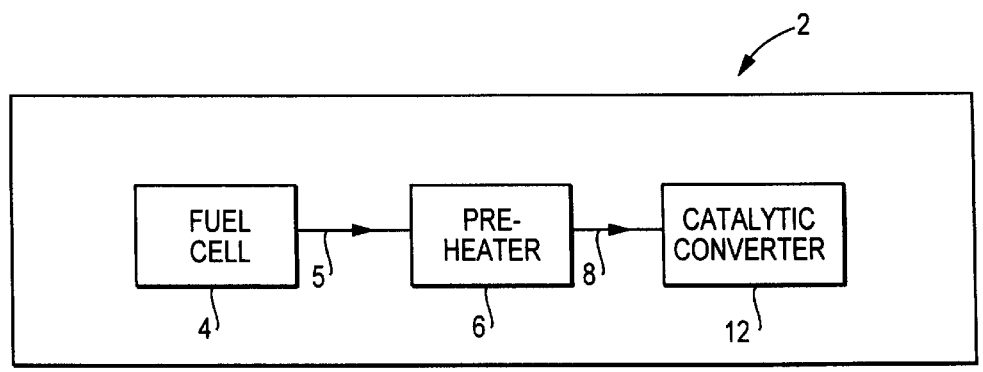
FIG. 2 is a partial view of a vehicle in which a fuel cell connected to the pre-heater of a catalytic converter is shown schematically.

FIG. 2 shows an embodiment of a vehicle 2 in which the component configured to receive output from the pre-heater 6 is a catalytic converter 12. When the component is a catalytic converter, an improved method for warming the fuel cell at low ambient temperature, and for reducing vehicular emissions is provided. For example, activation of the fuel cell at a predetermined minimum set point initiates generation of electricity. This electricity can be used to bring the catalyst to a temperature at which, if exhaust gas were being generated (i.e., if the engine were started), the converter would already be able to convert a significant portion of the pollutants contained in the exhaust to non-pollutants. In other words, the lag period between start-up of the vehicle and effective conversion by the catalytic converter of pollutants contained in the exhaust would be significantly decreased. Whereas most vehicles generate the majority of pollutants within approximately the first three minutes following start-up, a vehicle embodying features of the present invention would generate fewer pollutants within the same time frame.

Figure 3:
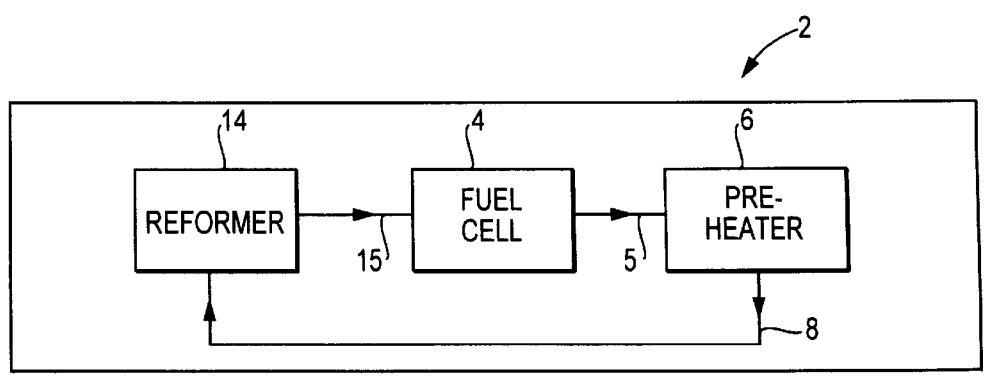
FIG. 3 is a partial view of a vehicle in which a fuel cell connected to the pre-heater of a reformer is shown schematically.

FIG. 3 shows an embodiment of a vehicle 2 in which the component coupled to the pre-heater 6 is a reformer 14 that uses raw hydrocarbon fuels, such as methanol and gasoline, to produce hydrogen rich gas 15 for consumption by the fuel cell. Two types of reformer technology currently in use are steam reforming of methanol, and partial oxidation of gasoline. Both types of reformers involve pre-vaporization of a raw hydrocarbon fuel and, therefore, could benefit from pre-heating. Steam reforming of methanol involves the reaction between steam and pre-vaporized methanol at about 200° C., whereas partial oxidation takes places at much higher temperatures.

Thus, in accord with the present invention, the component coupled to the pre-heater can be a reformer selected from the group consisting of a gasoline reformer and a methanol reformer. At low ambient temperature, the fuel cell is activated and begins to generate electricity. A portion of this electricity can be used to power the pre-heater of the reformer.

Figure 4:
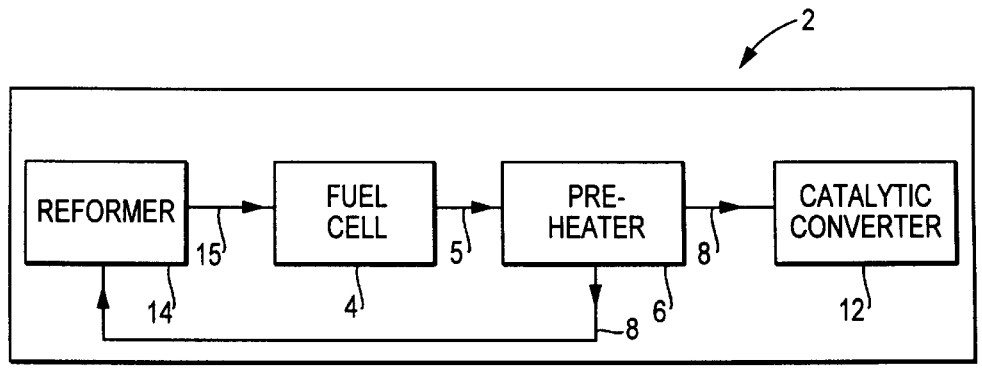
FIG. 4 is a partial view of a vehicle in which a fuel cell connected to the pre-heater of a catalytic converter and a reformer is shown schematically.

FIG. 4 shows an embodiment of a vehicle 2 in which the component coupled to the pre-heater 6 includes both a reformer 14 and a catalytic converter 12. Such a combination would be useful in that the reactions by which raw hydrocarbon fuels such as methanol and gasoline are converted to hydrogen rich gas tend to be inefficient, and to produce various emissions that would ideally be processed in a catalytic converter. In such an embodiment, a portion of the electricity 5 generated by the fuel cell 4 can be used to power a pre-heater 6 of reformer 14 and catalytic converter 12.

Figure 5:
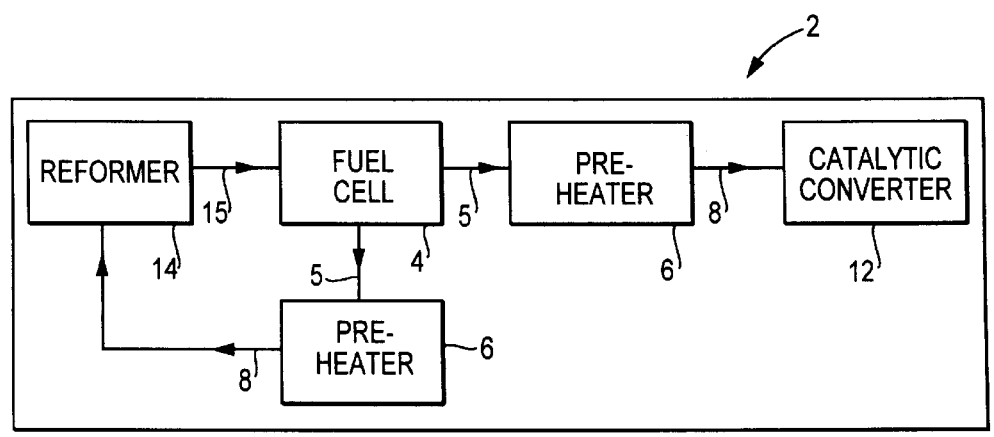
FIG. 5 is a partial view of a vehicle in which a fuel cell connected to the pre-heater of a catalytic converter and to the pre-heater of a reformer is shown schematically.

FIG. 5 shows an embodiment of a vehicle 2 in which a fuel cell 4 is electrically coupled to a pre-heater 6 for pre-heating reformer 14, and to a pre-heater 6 for pre-heating catalytic converter 12. This embodiment differs from that shown in FIG. 4 in that a separate pre-heater 6 is used to pre-heat each of reformer 14 and catalytic converter 12. A portion of the electricity 5 generated by the fuel cell 4 is used to power each of the individual preheaters. Preferably, each of these individual pre-heaters should be configured for optimized pre-heating of the specific component to which it is coupled. Thus, the two pre-heaters 6 shown in FIG. 5 may not be the same, but may differ, for example, in the magnitude of their power output.

Figure 6:
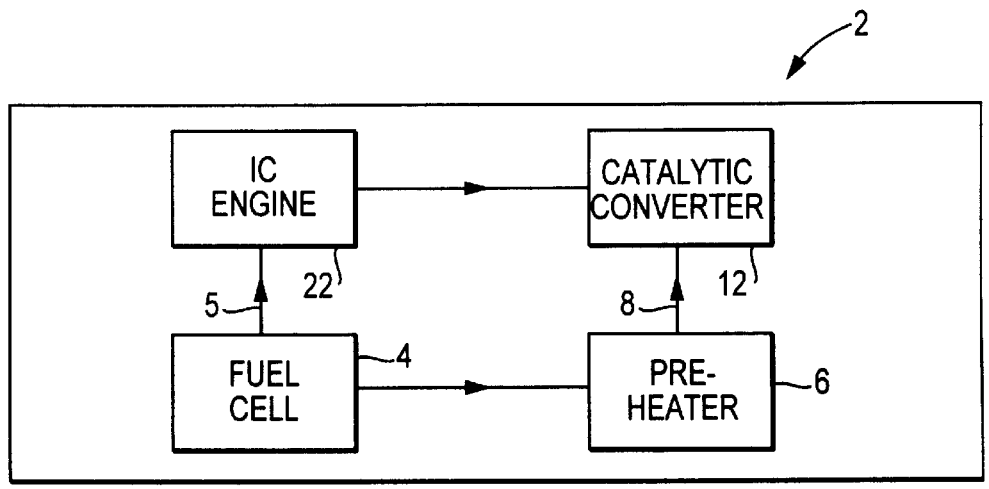
FIG. 6 is a partial view of a vehicle in which a first embodiment of a fuel cell connected to an internal combustion engine is shown schematically.

Vehicles embodying features of the present invention may optionally comprise an internal combustion (IC) engine. FIG. 6 shows a first embodiment of a vehicle 2, which includes both a fuel cell 4 and an internal combustion engine 22. In such vehicles, the engine will be electrically coupled to the fuel cell, which fuel cell may be present as a replacement for a conventional alternator. In vehicles lacking an internal combustion engine, the vehicle may comprise a full-vehicle fuel cell and, optionally, a reformer.

Figure 7:
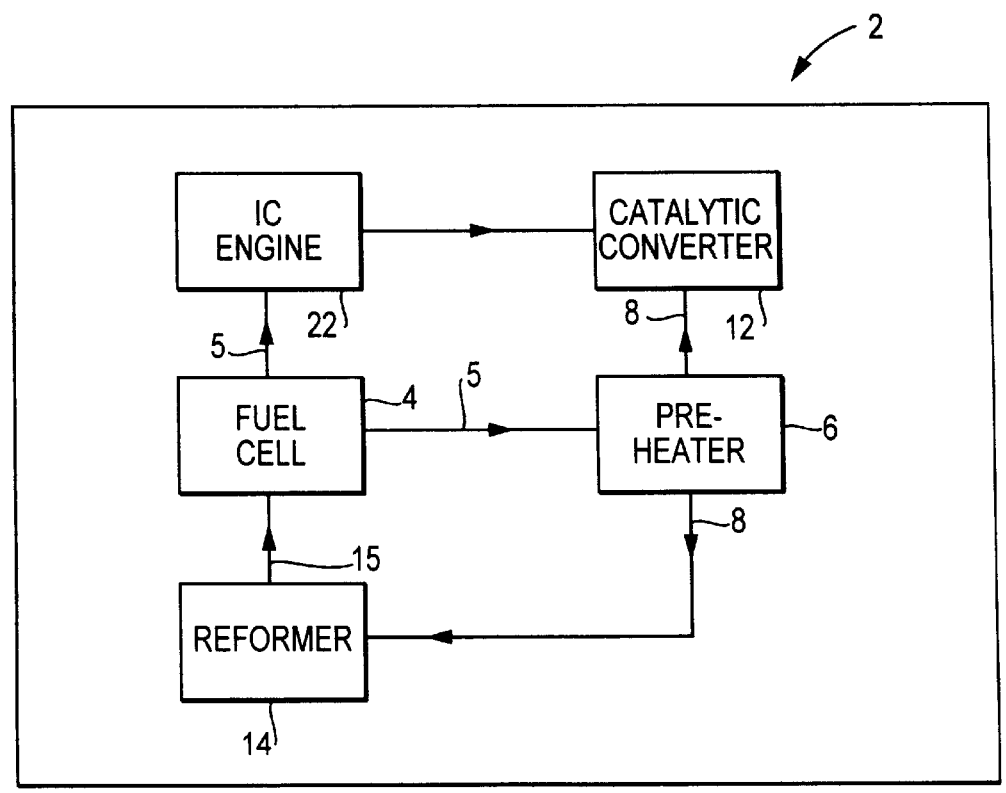
FIG. 7 is a partial view of a vehicle in which a second embodiment of a fuel cell connected to an internal combustion engine is shown schematically.

FIG. 7 shows a second embodiment of a vehicle 2, which includes both a fuel cell 4 and an internal combustion engine 22. In this embodiment, the fuel cell 4 is electrically connected to a pre-heater 6, which is used to pre-heat a catalytic converter 12 and a reformer 14. In a related embodiment (not shown), two separate pre-heaters can be used to pre-heat each of a reformer and a catalytic converter, as was shown in the embodiment in FIG. 5.

Figure 8:
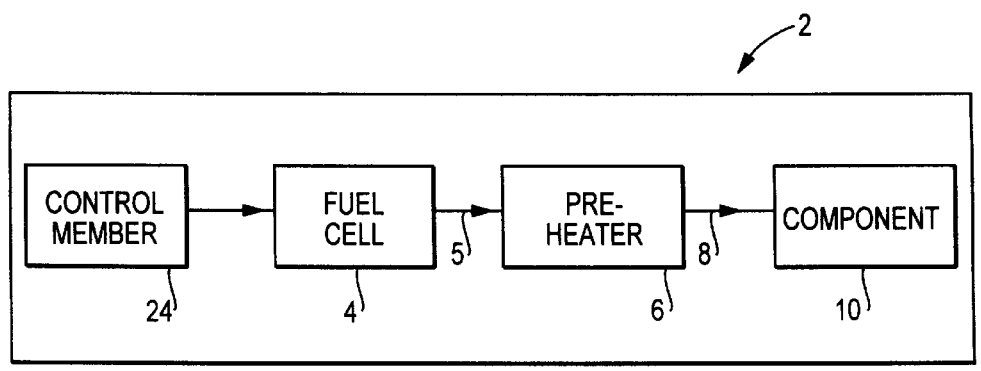
FIG. 8 is a partial view of a vehicle in which a control member connected to a fuel cell, itself connected to the pre-heater of a catalytic converter, is shown schematically.

Preferably, vehicles embodying features of the present invention further comprise a control member. FIG. 8 shows an embodiment of a vehicle 2 in which the fuel cell 4 is electrically coupled to a control member 24. The control member 24 regulates activation, deactivation, and load point of the fuel cell, and enables the fuel cell to operate in either a "cycling" or a "steady state" mode. In embodiments based on a "cycling" mode of operation, the fuel cell is activated by the control member for a period of time when a measured temperature reaches a minimum set point, and deactivated when a measured temperature reaches a maximum set point. In general, this minimum set point should, preferably, lie above the freezing/solidification temperature of the particular fuel cell electrolyte involved. Furthermore, this minimum set point should be high enough that the fuel cell is operable.

Both the minimum and maximum set points will be determined based upon the particular type of fuel cell to be used. Different fuel cells operate at different temperatures and within different ranges of temperatures, and may be activated and deactivated at different minimum and maximum set points, respectively. Exemplary operating temperatures for the main types of fuel cells commonly used include the following approximate ranges: 60–100° C. for polymer electrolyte membrane fuel cells; 90–100° C. for alkaline fuel cells; 175–200° C. for phosphoric acid fuel cells; 600–1000° C. for molten carbonate fuel cells; and 600–1000° C. for solid oxide fuel cells. Since each of these types of fuel cells produces water as a byproduct of the electrochemical reaction, each type should, preferably, be activated at a temperature above the freezing point of water (i.e., 0° C.). On the other hand, the maximum set point temperature at which these fuel cells should be deactivated may differ from one type to another to a greater extent than would the minimum set point temperature. In general, the maximum set point should not exceed the highest permitted operating temperature of the particular fuel cell. Ideally, the maximum set point should be relatively close to the minimum set point at which the fuel cell is activated, because this would minimize the fuel consumption of the fuel cell.

In embodiments based on "steady state" operation of the fuel cell, the control member activates the fuel cell, and adjusts the load point of the fuel cell according to variations in the measured temperature. At low ambient temperature, the load point can be set such that generation of electricity by the fuel cell will proceed with low efficiency and, in turn, more heat will be generated within the fuel cell, thereby warming the fuel cell. The temperature at which the fuel cell is maintained while the measured temperature is below the maximum set point can be calibrated and may differ for the different types of fuel cells. When the measured temperature reaches a maximum set point, the load point can then be adjusted to correspond to more efficient production of electricity and, in turn, to less heat generation within the cell. In such a way, the fuel cell as well as the component connected to the pre-heater can be maintained at set temperatures or within set temperature ranges. The load point of the fuel cell, the fuel cell temperature, and the temperature of the component coupled to the pre-heater are each calibratable and are regulated by the control member.

The time during which the fuel cell is activated and generating electricity at a calibrated load point is determined by the settings of the control member. The longer the fuel cell remains activated, the more electricity it will generate and, in accord with the present invention, the more electricity will be available to power the pre-heater. In embodiments wherein the component coupled to the pre-heater is a catalytic converter, it is desirable that the load point and time during which the fuel cell is activated is at least long enough so that the catalytic converter can reach an operating temperature at which it can begin to convert exhaust pollutants into non-pollutants. The system can be maintained at this condition, dependant on ambient temperature, fuel consumption and catalytic converter temperature. Preferably, the activation period will be at least long enough so that the catalytic converter can reach the "light-off" temperature (i.e., the temperature at which 50% of the emissions that would be produced by the engine, if the engine were running, would be converted by passage through the catalyst).

The manner in which the fuel cell is electrically connected to the pre-heater does not affect the practice of the invention, and can be accomplished in ways that are understood by those of ordinary skill in the art. For example, the fuel cell can simply be connected to a power bus of the vehicle, such that a pre-heater likewise connected to the power bus will be electrically coupled to the fuel cell.

The size and output of the pre-heater should preferably be selected so that the component coupled to the pre-heater can attain at least a minimum operating temperature at which it begins to efficiently function (e.g., in the case of a catalytic converter, this minimum operating temperature would correspond to a temperature at or above which the catalyst converts pollutants into non-pollutants). In addition, the size and output of the pre-heater should preferably be selected so that the fuel cell electrically coupled to it can generate sufficient electricity to attain at least the lower limit of its optimum operating temperature range (e.g., in the case of a polymer electrolyte membrane fuel cell, this lower limit would correspond to about 60° C.).

The schematic diagrams shown in FIGS. 1–8 are illustrative of representative vehicles embodying features of the present invention, and are not intended as limiting examples. Considerable variation can be made in the connectivity and placement of parts. For example, the placement and number of pre-heaters 6 can vary from one application to another. Similarly, the placement and number of control members 24 can be varied. These and related variations are well-known to those of ordinary skill in the art, and fall within the scope of the appended claims and their equivalents.

The present invention can be practiced using any type of fuel cell. Preferably, the fuel cell is selected from the group consisting of but not limited to: a polymer electrolyte membrane fuel cell, a direct methanol fuel cell, an alkaline fuel cell, a phosphoric acid fuel cell, a molten carbonate fuel cell, a solid oxide fuel cell, and combinations thereof. More preferably, the fuel cell is selected from the group consisting of a polymer electrolyte membrane fuel cell, a direct methanol fuel cell, and a combination thereof. Still more preferably, the fuel cell is a polymer electrolyte membrane fuel cell.

A method for operating a fuel cell in a vehicle that embodies features of the present invention comprises: generating electricity from the fuel cell; and providing a portion of the electricity to a pre-heater, which pre-heater provides an output to a vehicular component to pre-heat the component. The method may further comprise one or more of: measuring a temperature; operating the fuel cell at a calibrated load point; decreasing the portion of electricity provided to the pre-heater when the measured temperature is below a minimum set point; and increasing the portion of electricity provided to the pre-heater when the measured temperature is above a maximum set point.

A second method for operating a fuel cell in a vehicle that embodies features of the present invention comprises: measuring a temperature; activating the fuel cell when the measured temperature is below a minimum set point; generating electricity from the fuel cell; providing a portion of the electricity to a pre-heater, which pre-heater provides an output to a vehicular component; and pre-heating the component. The method may further comprise one or more of: deactivating the fuel cell when a maximum set point is reached; maintaining a calibrated load point of the fuel cell; maintaining the fuel cell at a set temperature; and maintaining the component at a set temperature.

Preferably, the minimum set point exceeds the freezing point of water. In addition, the difference between the minimum set point at which the fuel cell is activated and the maximum set point at which the fuel cell is deactivated is calibrated depending on the type of fuel cell.

Preferably, the vehicular component is one that benefits from pre-heating. More preferably, the component is selected from the group consisting of a catalytic converter, a gasoline reformer, a methanol reformer, and combinations thereof. When the component is a catalytic converter, a method is provided for reducing vehicular emissions.

A method for reducing vehicular emissions that embodies features of the present invention, comprises: operating a fuel cell at a calibrated load point; generating electricity from the fuel cell; providing a portion of the electricity to a pre-heater, which pre-heater provides an output to a catalytic converter, thereby pre-heating the catalytic converter. The method may further comprise one or more of: deactivating the fuel cell when a maximum set point is reached; maintaining a calibrated load point of the fuel cell; maintaining the fuel cell at a set temperature; and maintaining the catalytic converter at a set temperature.

A further method for reducing vehicular emissions that embodies features of the present invention, comprises: measuring a temperature; activating a fuel cell when the measured temperature is below a minimum set point; generating electricity from the fuel cell at a calibrated load point; providing a portion of the electricity to a pre-heater, which pre-heater provides an output to a catalytic converter, thereby pre-heating the catalytic converter; and deactivating the fuel cell when either of a maximum set point or a maximum operating temperature of the fuel cell is reached.

In an alternative embodiment, a method for reducing vehicular emissions further comprises: starting an internal combustion engine; generating an exhaust containing pollutants; and converting a portion of the pollutants into non-pollutants over a period of time. Preferably, the portion of pollutants converted constitutes at least about 50% of the total pollutants produced. The time period required to convert at least about 50% of the pollutants to non-pollutants is, preferably, less than about 90 seconds after the starting of the engine. More preferably, this time period is less than about 30 seconds after the starting of the engine. Still more preferably, this time period is less than about 5 seconds after the starting of the engine.

The foregoing detailed description has been provided by way of explanation and illustration, and is not intended to limit the scope of the appended claims. Many variations in the presently preferred embodiments illustrated herein will be obvious to one of ordinary skill in the art, and remain within the scope of the appended claims and their equivalents.

What is claimed is:

1. A vehicle comprising:
   a fuel cell that generates electricity, which is activated for a period of time sufficient to maintain the fuel cell at a set temperature or within a set range of temperatures;
   a pre-heater electrically coupled to the fuel cell, which is configured to receive a portion of the electricity prior to initiating an electrical arc that starts the vehicle, wherein the pre-heater provides an output; and
   a component configured to receive a portion of the output, wherein a temperature of the component is changed through receipt of the portion.

2. The vehicle of claim 1 wherein the temperature of the component is increased through receipt of the portion.

3. The vehicle of claim 1 wherein the fuel cell comprises a fuel cell selected from the group consisting of a polymer electrolyte membrane fuel cell, a direct methanol fuel cell, an alkaline fuel cell, a phosphoric acid fuel cell, a molten carbonate fuel cell, a solid oxide fuel cell, and combinations thereof.

4. The vehicle of claim 1 further comprising an internal combustion engine electrically coupled to the fuel cell.

5. The vehicle of claim 4 wherein the component comprises a catalytic converter.

6. The vehicle of claim 1 further comprising a control member electrically coupled to the fuel cell, such that the control member activates the fuel cell for a period of time when a minimum set point is reached, and deactivates the fuel cell when a maximum set point is reached.

7. The vehicle of claim 6 wherein the component comprises a catalytic converter, and wherein the period of time is long enough for the catalytic converter to reach an operating temperature corresponding to at least 50% efficiency.

8. The vehicle of claim 1 wherein the component comprises a reformer selected from the group consisting of a gasoline reformer and a methanol reformer.

9. The vehicle of claim 8 wherein the component further comprises a catalytic converter.

10. The vehicle of claim 9 further comprising an internal combustion engine electrically coupled to the fuel cell.

11. A method for operating a fuel cell in a vehicle comprising:
   activating the fuel cell for a period of time sufficient to maintain the fuel cell at a set temperature or within a set range of temperatures, thereby generating electricity; and
   providing a portion of the electricity to a pre-heater, which pre-heater provides an output to a vehicular component to pre-heat the component and which preheater is configured to receive a portion of the electricity prior to initiating an electrical arc that starts the vehicle.

12. The method of claim 11, further comprising:
   measuring a temperature;
   decreasing the portion of electricity provided to the pre-heater when the measured temperature is below a minimum set point; and
   increasing the portion of electricity provided to the pre-heater when the measured temperature is above a maximum set point.

13. The method of claim 11 further comprising operating the fuel cell at a calibrated load point.

14. The method of claim 13 wherein the vehicular component is a catalytic converter.

15. The method of claim 11 further comprising:
   measuring a temperature; and
   activating the fuel cell when the measured temperature is below a minimum set point.

16. The method of claim 15 further comprising operating the fuel cell at a calibrated load point.

17. The method of claim 15 further comprising deactivating the fuel cell when a maximum set point is reached.

18. The method of claim 17 wherein the minimum set point exceeds the freezing point of water.

19. The method of claim 17 wherein the maximum set point is a maximum operating temperature of the fuel cell.

20. The method of claim 17 wherein the maximum set point exceeds the minimum set point by less than 50 degrees Centigrade.

21. The method of claim 17 wherein the component comprises a catalytic converter.

22. The method of claim 17 wherein the component comprises a reformer selected from the group consisting of a gasoline reformer and a methanol reformer.

23. The method of claim 17 wherein the component comprises a catalytic converter and a reformer.

24. A method for reducing vehicular emissions comprising:
   activating the fuel cell for a period of time sufficient to maintain the fuel cell at a set temperature or within a set range of temperatures, thereby generating electricity; and providing a portion of the electricity to a pre-heater, which pre-heater provides an output to a catalytic converter, thereby pre-heating the catalytic converter, and which preheater is configured to receive a portion of the electricity prior to initiating an electrical arc that starts a vehicle.

25. The method of claim 24 further comprising:

measuring a temperature; and activating a fuel cell when the measured temperature is below a minimum set point.

26. The method of claim 25, further comprising:

starting an internal combustion engine;

generating an exhaust containing pollutants; and converting about 50% of the pollutants to non-pollutants in less than about 30 seconds from the starting of the engine.

27. The method of claim 24 further comprising:

operating the fuel cell at a calibrated load point.

28. The method of claim 27, further comprising:

starting an internal combustion engine;

generating an exhaust containing pollutants; and converting about 50% of the pollutants to non-pollutants in less than about 30 seconds from the starting of the engine.

29. The method of claim 28 further comprising:

measuring a temperature; and activating a fuel cell when the measured temperature is below a minimum set point.

\* \* \* \* \*